United States Patent
Hulsken

(10) Patent No.: US 10,082,663 B2
(45) Date of Patent: Sep. 25, 2018

(54) METHOD FOR SIMULTANEOUS CAPTURE OF IMAGE DATA AT MULTIPLE DEPTHS OF A SAMPLE

(71) Applicant: KONINKLIJKE PHILIPS N.V., Eindhoven (NL)

(72) Inventor: Bas Hulsken, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/911,578

(22) Filed: Mar. 5, 2018

(65) Prior Publication Data

US 2018/0196249 A1 Jul. 12, 2018

Related U.S. Application Data

(63) Continuation of application No. 15/124,610, filed as application No. PCT/EP2015/079331 on Dec. 11, 2015, now Pat. No. 9,910,258.

(30) Foreign Application Priority Data

Dec. 22, 2014 (EP) ..................................... 14199531

(51) Int. Cl.
| | |
|---|---|
| *H04N 13/00* | (2018.01) |
| *G02B 21/36* | (2006.01) |
| *G02B 21/00* | (2006.01) |
| *H04N 13/02* | (2006.01) |
| *G02B 21/22* | (2006.01) |
| *H04N 13/218* | (2018.01) |

(52) U.S. Cl.
CPC ......... *G02B 21/367* (2013.01); *G02B 21/002* (2013.01); *G02B 21/22* (2013.01); *H04N 13/0217* (2013.01); *H04N 13/218* (2018.05)

(58) Field of Classification Search
CPC . G02B 21/367; G02B 21/002; H04N 13/0217
USPC .......................................................... 348/43
See application file for complete search history.

(56) References Cited

U.S. PATENT DOCUMENTS

| | | | |
|---|---|---|---|
| 2002/0054299 A1 | 5/2002 | Freifeld | |
| 2008/0273776 A1 | 11/2008 | Krief | |
| 2012/0287256 A1 | 11/2012 | Hulsken | |
| 2014/0125776 A1* | 5/2014 | Damaskinos | ........ G02B 21/365 348/50 |

FOREIGN PATENT DOCUMENTS

WO 200184209 A2 11/2001

* cited by examiner

*Primary Examiner* — Jeffery Williams

(57) ABSTRACT

A novel method is disclosed to allow for the simultaneous capture of image data from multiple depths of a volumetric sample. The method allows for the seamless acquisition of a 2D or 3D image, while changing on the fly the acquisition depth in the sample. This method can also be used for auto focusing. Additionally this method of capturing image data from the sample allows for optimal efficiency in terms of speed, and light sensitivity, especially for the herein mentioned purpose of 2D or 3D imaging of samples when using a tilted configuration as depicted in FIG. 2. The method may be particularly used with an imaging sensor comprising a 2D array of pixels in an orthogonal XY coordinate system where gaps for electronic circuitry are present. Also other imaging sensor may be used. Further, an imaging device is presented which automatically carries out the method.

16 Claims, 5 Drawing Sheets

METHOD FOR SIMULTANEOUS CAPTURE OF IMAGE DATA AT MULTIPLE DEPTHS OF A SAMPLE

CROSS-REFERENCE TO PRIOR APPLICATIONS

This application is a Continuation application of U.S. application Ser. No. 15/124,610, filed Sep. 8, 2016, which is the U.S. National Phase application under 35 U.S.C. § 371 of International Application No. PCT/EP2015/079331, filed on Dec. 11, 2015, which claims the benefit of European Patent Application No. 14199531.6, filed on Dec. 22, 2014. These applications are hereby incorporated by reference herein.

FIELD OF THE INVENTION

The present invention relates to the field of imaging a sample, and applies advantageously in the field of digital pathology.

In particular, the present invention relates to a method for simultaneously capturing image data at multiple depths of a sample and to an imaging system for simultaneous capture of image data of a sample at multiple depths.

BACKGROUND OF THE INVENTION

A digital scanning microscope usually makes a digital image of a sample such as a tissue sample placed in a microscope slide. This is typically done by scanning the sample over the whole microscope slide and stitching different image spans together and/or by overlaying images measured at different wavelengths. FIG. 1 schematically represents a cross-section 100 of such a microscope slide. A glass slide 101, a cover slip 102 and a mounting medium 103 for fixing and sealing off a sample 104, like e.g. a biological tissue layer, are comprised. It is known, for example, from WO 2001/084209, that digital scanning microscopes can comprise a 2D line sensor, also known as a line scan camera or as a linear array sensor. Such sensors comprise only one line, said differently one row, of sensing pixels. It is also known that compared to other types of sensors, like 2D array sensors, for example, 1D line sensors are able to provide better continuous mechanical scanning operation, less stitching problems, and can allow for the use of so-called time delay integration (TDI) line sensors.

Furthermore, current imaging sensor designs provide photoactive pixels which consist of photosensitive parts, i.e. photodiodes, and also comprise non-photosensitive parts like a plurality of charge to voltage converters (CVC) that are embedded in the pixel itself leading to a lower fill factor. This means that the pixel typically has three transistors (rolling shutter) of four transistors (global shutter) for the CVC and both vertical and horizontal metal lines for addressing and read out are needed. However, such non-photosensitive parts of the pixel reduce the fill factor of the pixel which is especially harming during low light conditions. The resulting low light sensitivity of pixels in a conventional sensor is typically overcome by applying microlenses. Such microlenses try to effectively focus less amount of light onto the pixels of the imaging sensor such that the collateral loses are minimized. In addition, currently available imaging sensors provide for a relative low speed in reading out the region of interest (ROI) as only a limited number of read out electronics can be provided within the limited space of a given pixel size.

SUMMARY OF THE INVENTION

The inventors of the present invention have realized that the use of microlenses is particularly not suitable when the imaging sensor is tilted with respect to the optical path, which is applied often, inter alia, in digital pathology. Moreover, the inventors of the present invention have found that scanning and imaging the sample with a tilted sensor leads to an oversampling in Z direction such that only particular areas of the imaging sensor need to be used for image capturing. Hence, the inventors of the present invention found that one may use during imaging only pixel lines of the 2D imaging device or imaging sensor which are offset with respect to each other along the scan direction by an offset. This offset may, as example, either be a non-photosensitive gap as depicted in FIGS. 3 to 5, or may be one or more deactivated lines of pixels which are currently not used for image generation. For such an imaging device a novel imaging method is presented herein and details thereabout will be explained in the context of several different exemplary embodiments. The object of the present invention may be seen as providing for an improved method and system for image capturing.

The object of the present invention is solved by the subject-matter of the independent claims. Further embodiments and advantages of the invention are incorporated in the dependent claims.

The described embodiments similarly pertain to the method for image capturing and the imaging system.

According to an exemplary embodiment of the present invention a method for simultaneous capture of image data at multiple depths of a sample is presented. The method uses an imaging device having an optical axis, and the imaging device comprises an imaging sensor tilted with respect to the optical axis. The imaging sensor that is used in the presented method has a first pixel line comprising a plurality of pixels and a second pixel line comprising a plurality of pixels. The first and second pixel lines have a different optical path length to the sample along the optical axis of the imaging device, and the first pixel line and the second pixel line are offset with respect to each other along the scan direction by an offset. The method comprises the steps of scanning the sample along the scan direction (X') which is substantially perpendicular to the optical axis and perpendicular to a main extension direction (Y) of the first and second pixel lines, capturing a first image of the sample from the first pixel line, and simultaneously capturing a second image of the sample from the first pixel line and capturing a third image of the sample from the second pixel line. Moreover, continuing capturing images of the sample from the second pixel line is a further step of the method as well as stopping capturing images of the sample from the first pixel line.

Therefore, a read-out method for generating seamless 2D or 3D images while changing capture depth during the scanning is presented. This allows a fast image acquisition of not perfectly flat and/or volumetric samples and can be specifically applied in digital slide scanners, e.g. for digital pathology, but also in other technical fields. With this method it is possible to capture a seamless image, which would not be possible without the temporary dual, i.e., simultaneous readout, because a change in line sensor results not only in a change of acquisition depth, but also in a translation along the scan direction. This latter translation causes either a gap in the image, or a repetition of image data. The method as described before is necessary to prevent the gap. For the repetition, part of the image data can be discarded, but no dual acquisition is needed. It is important to stress, that this method would also be required when changing ROI in a conventional 2D CMOS sensor when it's used for the purpose of a 2D autofocus system. This is because any change in the ROI that leads to an effective change in acquisition depth will also lead to a translation along the scan direction, if the 2D CMOS sensor is tilted with respect to the optical axis. This translation along the scan direction will need to be compensated, if an undistorted final image is to be obtained. The present invention avoids such distortions as explained herein. The presented method can be automatically carried out by an imaging device as disclosed herein.

Of course more lines of pixels than the first and second line can be used by this method for capturing image data. As can easily be gathered from the embodiment examples shown in FIGS. 3 to 5, a large plurality of pixel lines/line sensors, which are all respectively offset from each other, can be used.

As is apparent for the skilled reader from this disclosure, each pixel of a pixel line captures an image, and subsequent processing generates an image that is captured by the pixel line.

In general, two cameras, i.e., at least the two lines of pixels, are provided at different distances from the sample such that they focus at a different depth in the sample.

Between these two cameras the "offset" as defined below is located. Also a large 2D sensor can be used as will be explained in more detail hereinafter and as is show in e.g. FIG. 3.

The term "offset" or "gap" as used in the context of the present invention shall be understood as a space or distance between two neighbored lines of pixels which space is not photoactive. This space may, for example, be used for placing read-out electronics in such areas of the sensor or may be embodied by one or more lines of pixels which are currently not activated and thus not photoactive as the pixels in the gap are just not used. The offset is currently not capturing an image.

Thus, a novel method is disclosed to allow for the simultaneous capture of image data from multiple depths of a volumetric sample. The method allows for the seamless acquisition of a 2D or 3D image, while changing on the fly the acquisition depth in the sample. This method can also be used for auto focusing. Additionally this method of capturing image data from the sample allows for optimal efficiency in terms of speed, and light sensitivity, especially for the herein mentioned purpose of 2D or 3D imaging of samples when using a tilted configuration as depicted in FIG. 2.

For example, this method can be applied by an imaging sensor of an imaging device which combines multiple TDI line sensors on a single die, which will be explained in detail in the context of the embodiments shown in FIGS. 3 to 5. There, the TDI line sensors are separated by a gap. Such a sensor may have a dual (TDI) read-out engine, which allows efficient reading out of at least two line sensors at maximum speed and sensitivity. The improvement over a conventional 2D sensor of the same size and resolution achieved by this novel design and read out method is twofold. First, the gap between the photo sensitive parts/lines of pixels (the TDI linesensors) can be used to put the logic and connective circuitry of the sensor. This allows for maximizing the photo active part of the pixels in the photo sensitive area of the sensor, i.e. maximize the fill factor. This allows for a sensitive sensor without microlenses that are common on 2D CMOS sensors. Avoiding micro-lenses is important for placing the sensor tilted in the optical path. Second, the gap allows for faster read-out because more circuitry can be on the sensor in the gap, allowing for a faster read out method and a faster sensor.

As will be easily understood by a person skilled in the art, the invention may be not limited to a configuration of the system in which the sensor should be tilted with respect to the optical axis. The invention obviously encompasses other configurations in which the sensor is not tilted and in which the imaging system is arranged such that this sensor can image an oblique cross section of the sample. Thus, the generation of said different optical path lengths from the sample to the sensor may be made using other techniques well-known in the art such as inserting an optical element, for instance a prism, in the light path.

The method of simultaneous capture of image data at multiple depths of a sample overcomes two problems that result from normal imaging methods using a normal 2D CMOS sensor for the autofocus and 3D imaging. On the one hand low light sensitivity due to low fill factor of pixels in a normal 2D CMOS sensor can be improved. This is normally overcome with micro-lenses, but micro-lenses are not suitable for use when the sensor is tilted with respect to the optical path as shown in FIG. 2. Moreover, the low speed in ROI read-out of normal 2D CMOS sensors can be increased by the present invention as more read-out electronics can placed in the spaces between first pixel line and the second pixel line, as described in more detail, for example, in the context of FIGS. 4 and 5. According to another exemplary embodiment of the present invention the offset is either a first non-photosensitive gap between the first and the second pixel lines or is one or more non-capturing pixel line(s) between the first and the second pixel lines which non-capturing pixel line(s) is (are) deactivated.

According to another exemplary embodiment of the present invention the non-photosensitive gap extends parallel to the first and second pixel line. As will be explained in the context of FIG. 3, this direction will be named Y direction. The method of the present invention can be used with an imaging sensor that comprises a 2D array of pixels in an orthogonal XY coordinate system, the 2D array of pixels of the sensor comprising a plurality of pixels, and each of the pixel lines extends along the Y direction.

As will become apparent from and elucidate with the exemplary embodiments depicted and explained in the context of FIGS. 3 to 5 the steps of the method for simultaneous capture of image data at multiple depths of the sample are carried out during scanning the sample by a scanning imaging system. Such a scanning imaging system is another exemplary embodiment of the present invention.

According to another exemplary embodiment of the present invention the simultaneous capturing of the second image and the third image is carried out for as long as it takes to bridge the offset between the first pixel line and the second pixel line during scanning. Therefore, the read-out method generates seamless 2D or 3D images while changing capture depth during the scanning. Clearly, this allows a fast image acquisition of not perfectly flat and/or volumetric samples. The calculation to determine how long it takes to bridge the respective offset can be done by the skilled person without a problem. Starting from the distance between the two cameras, i.e., the two pixel lines, in projection one knows to how many pixels the distance relates. With the exposure frequency, i.e., the line rate, one knows how many pixels are in the offset/gap. In another exemplary embodiment it is also possible to do real time detection if for example the sample position might fluctuate during scanning. One example that might require real time detection would be the case where there is no scanning, but a flow in a fluid. This flow might be less regular, which means that it's not a fixed amount of exposures before the gap is bridged. The real time detection in this case would be tracking of the object's lateral position as it flows by.

According to another exemplary embodiment of the present invention the method further comprises the steps of detecting whether a change in acquisition depth is required, and actuating the second pixel line based on the detection that a change in acquisition depth is required. Many different technical means can be used for the detection whether a change in acquisition depth is needed. For example, focus signal detection as known in the art of imaging, detection in an additional optical path, e.g. a confocal microscope, previous knowledge of shape and/or orientation of the sample, or methods of predicting the optimal focus position can be used to determine that and which new line or lines need to be activated for image capturing. As such methods are already known to the skilled person they are not described in greater detail herein.

According to another exemplary embodiment of the present invention the imaging sensor which is used for the method presented herein further comprises a third pixel line comprising a plurality of pixels, wherein the first, second and third pixel lines each have a different optical path length to the sample along the optical axis of the imaging device. Further, the first pixel line and the third pixel line are offset with respect to each other along the scan direction (X') by an offset and the first pixel line is located between the second and the third pixel line. With this imaging sensor and according to the method the second pixel line is activated in case it has been detected that an increase in acquisition depth is required whereas the third pixel line is activated in case it has been detected that a decrease in acquisition depth is required.

In other words, first an image from the first line sensor is captured, second it is detected that a change in acquisition depth, i.e., change acquisition from current line sensor to the one above or below is needed and third capturing two images simultaneously from the current and the new, either above or below, line sensor, for as long as it takes to bridge the gap between the two line sensors at the current scan speed. Subsequently, it is continued capturing images or image data from the new line sensor, and capturing from the initial line sensor is stopped. With this flow it is possible to capture a seamless image.

According to another exemplary embodiment of the present invention discarding repetition data acquired by the first pixel line and/or the second pixel line is part of the method. In case an overlap of image data has been captured during the step of simultaneously capturing image data one part may be discarded or deleted. The same calculation as given before with respect to the determination of the time how long it takes to bridge the offset or gap between two pixel lines can be applied here. One may either throw away the data that was already captured, wait until the activated line is at a zone during scanning which has not been imaged, or one may combine these two alternatives.

According to another exemplary embodiment of the present invention generating a final image of the sample based on the captured images after the repetition data was discarded is part of the method.

According to another exemplary embodiment of the present invention a method as described before is presented which is a method for generating a three dimensional (3D) image of the sample. This 3D imaging method comprises the steps of capturing the first image of the sample from a first set of lines of pixels comprising the first pixel line, and simultaneously capturing the second image of the sample from the first set of lines of pixels and capturing a third image of the sample from a second set of lines of pixels comprising the second pixel line. Moreover, the steps of continuing capturing images of the sample from the second set of lines of pixels, and stopping capturing images of the sample from the first set of lines of pixels are comprised.

According to another exemplary embodiment of the present invention an imaging system with a first and second pixel line each comprising a plurality of pixels is presented. The device is configured to scan the sample along a scan direction (X') and the first pixel line and the second pixel line are offset with respect to each other along the scan direction by an offset. Further, the imaging system is configured to capture a first image of the sample from the first pixel line, and is configured to simultaneously capture a second image of the sample from the first pixel line and capturing a third image of the sample from the second pixel line. Moreover, the imaging system is configured to continue capturing images of the sample from the second pixel line and is configured for stopping capturing images of the sample from the first lines of pixels. Embodiments thereof will be explained in more detail in the context of the following Figures.

The imaging system has an imaging sensor comprising the mentioned pixel lines, wherein the imaging sensor is titled with respect to the optical axis of the imaging system.

According to another exemplary embodiment of the present invention the first pixel line of the imaging system is part of a first block that consists of several adjacent pixel lines extending along the Y direction, and the second pixel line is part of a second block that consists of several adjacent pixel lines extending along the Y direction. Further, the first and second blocks are separated from each other by a non-photosensitive gap extending along the Y direction. Such a TDI embodiment can be gathered from FIGS. 4 and 5.

According to another exemplary embodiment of the present invention the imaging system does not comprise microlenses.

According to another exemplary embodiment of the present invention each offset or non-photosensitive gap has a width of at least one width of a pixel of the used imaging sensor.

According to another exemplary embodiment of the present invention a scanning imaging system is presented, wherein the system is a digital scanning microscope for imaging a sample.

According to another exemplary embodiment of the present invention in the scanning imaging system the imaging sensor is tilted around the Y axis as an axis of rotation. According to another exemplary embodiment the method as presented herein is used in/by a digital scanning microscope to generate an image of a pathology sample.

These and other features of the invention will become apparent from and elucidated with reference to the embodiments described hereinafter.

BRIEF DESCRIPTION OF THE DRAWINGS

Exemplary embodiments of the invention will be described in the following drawings.

DETAILED DESCRIPTION OF EMBODIMENTS

Figure 2:
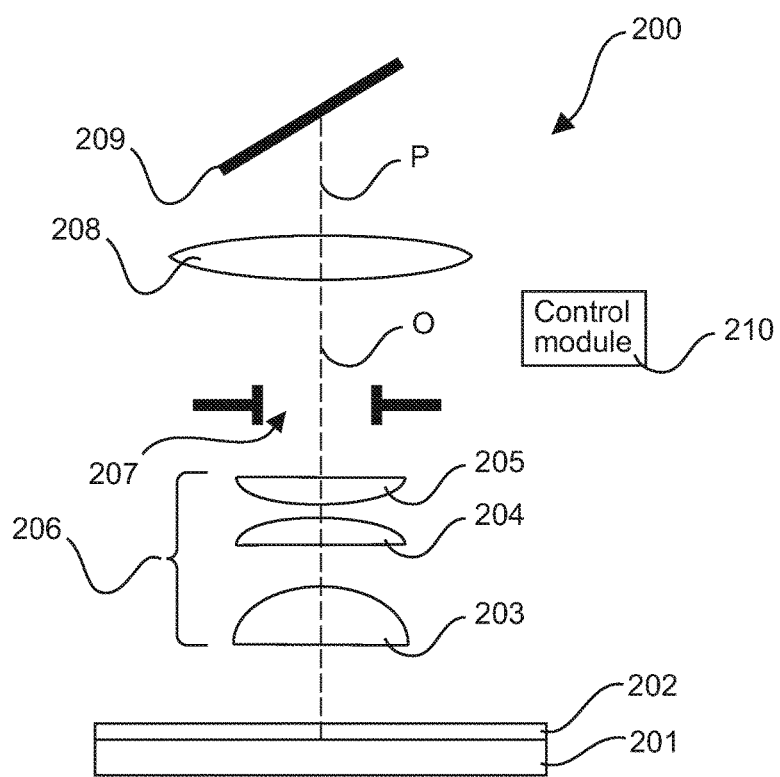
FIG. 2 schematically shows a scanning microscope according to an exemplary embodiment of the present invention.

According to an exemplary embodiment of an imaging system of the present invention a scanning microscope 200 is shown within FIG. 2. The imaging system 200 can carry out the method for simultaneous capture of image data at multiple depths of the sample as described herein. Particularly, the imaging system 200 is configured for carrying out the steps S1 to S5 as disclosed in the context of FIG. 6. However, it is important to note that the imaging system 200 allows for a read-out method for generating seamless 2D or 3D images while changing capture depth during the scanning. This allows a fast image acquisition of not perfectly flat and/or volumetric samples. With this method and imaging system 200 it is possible to capture a seamless image, which would not be possible without the temporary dual, i.e., simultaneous readout, because a change in line sensor results not only in a change of acquisition depth, but also in a translation along the scan direction. This latter translation causes either a gap in the image, or a repetition of image data. The method of the present invention prevents the gap. For the repetition, part of the image data can be discarded, but no dual acquisition is needed.

Of course the scanning imaging system 200 is arranged for imaging a sample, e.g. a tissue layer which is not shown in FIG. 2, which can be placed between the glass side 201 and the cover slit 202. Imaging path P may comprise a microscope objective 206 which may comprise one or more lenses 203, 204 and 205, an aperture 207 for blocking unscattered reflected light from the tissue sample, a tube lens 208 and an imaging sensor 209 according to the present invention. Imaging sensor 209 comprises a 2D array of pixels that can also be referred herein as a matrix of pixels. For example, the sensor is a CMOS imaging sensor but also other kinds of sensors can be used with the present invention. As can be seen from FIG. 2, imaging sensor 209 is tilted with respect to the optical axis o of the microscope objective lens. The imaging sensor 209 may be a self-focusing imaging sensor as explained herein. The system 200 further comprises a control module for controlling the operating process of the scanner, and in particular the scanning process for imaging the sample. The control module typically comprises a processor such as, for example, an FPGA (Field Programmable Gate Array) or a DCP (Digital Signal Processor). It should be noted, that the optical axis O can be parallel to the axis Z 309 that is defined in the following FIG. 3.

Figure 3:
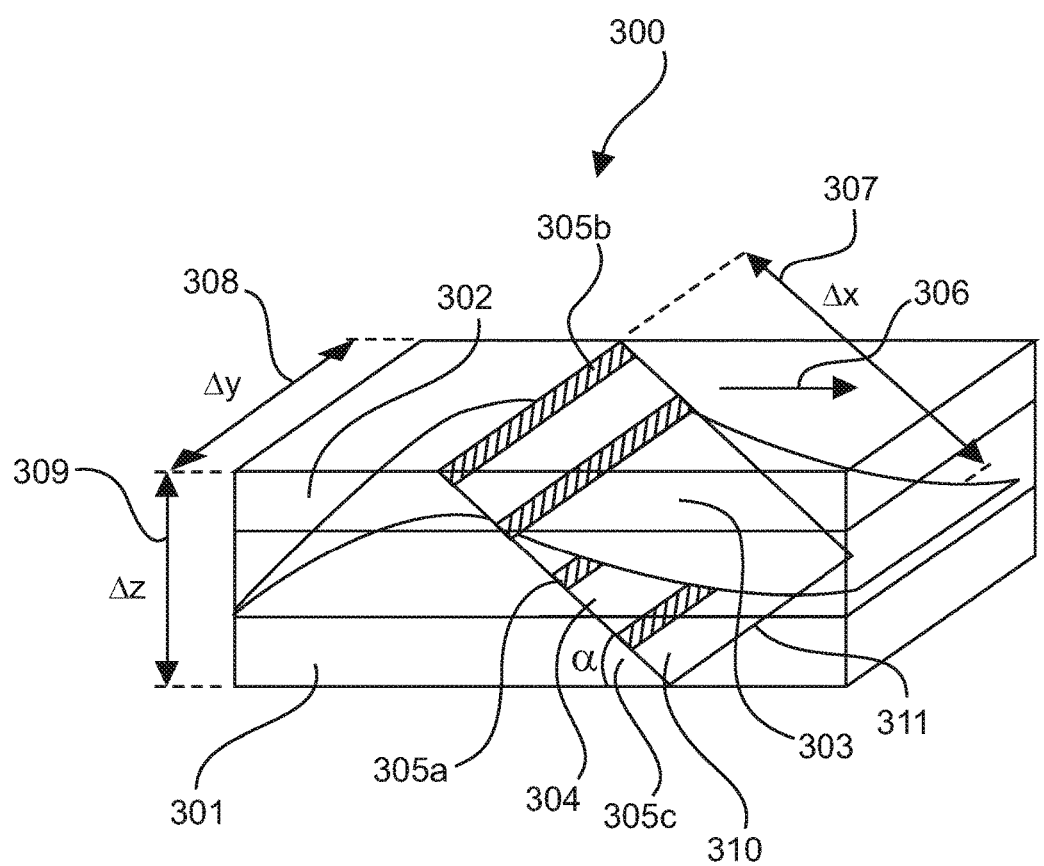
FIG. 3 shows a projection of an imaging sensor in object space according to an exemplary embodiment of the present invention.

The method of the present invention can for example be carried out with an imaging sensor 300 as shown in FIG. 3, and which will be explained in more detail hereinafter. In an exemplary embodiment the method comprises the steps of capturing an image from one line sensor/pixel line 304, detecting by whatever means that a change in acquisition depth, i.e., change acquisition from current line sensor/pixel line 304 to the one above or below 310 is needed, and capturing two images simultaneously from the current 304 and the new line 310, for as long as it takes to bridge the non-photosensitive gap 305c between the two line sensors at the current scan speed. As a further step continuing capturing from the new line sensor 310, and stop capturing from the initial line sensor 304 is comprised. With this method it is possible to capture a seamless image, which would not be possible without the temporary dual readout, because a change in line sensor results not only in a change of acquisition depth, but also in a translation along the scan direction. This latter translation causes either a gap in the image, or a repetition. Advantageously this method prevents the gap in the final image. For the repetition, part of the image data can be discarded, but no dual acquisition is needed. Detailed aspects about discarding image data have been described before.

Regarding the sensor used for this method FIG. 3 shows a projection 300 of an imaging sensor 311. Moreover, imaging sensor 311 may be a self-focusing imaging sensor. FIG. 3 shows that the imaging sensor 311 comprises several TDI blocks 304, 310 that respectively comprise a plurality of parallel pixel lines running along the Y direction shown with axis 308. The TDI blocks 304 and 310 are separated by a non-photosensitive gap 305c, in which the read out electronics of the pixels of at least one of said blocks are positioned. If desired, the read out electronics of both TDI blocks 304 and 310 can be positioned in the gap 305c. However, it is also possible, that the read out electronics of the pixels of block 310 are positioned in the non-photosensitive gap 305c and that the read out electronics of the pixels of block 304 are positioned in non-photosensitive gap 305a. Apparently it is possible to provide TDI blocks 304 and 310 as a pixel line which does not comprise charge to voltage converters and/or logics and/or connective circuitries. The latter components are entirely comprised by said non-photosensitive gaps of the imaging sensor 311 such that a maximization of the fill factor is achieved with a proper low light sensitivity is achieved. It should be noted, that the TDI blocks 304 and 310 are only illustrated schematically such that the plurality of adjacent pixel lines is not depicted here in detail. Such individual pixel lines constituting the TDI block may be gathered from following FIG. 4. Also the gaps 305a, 305b, and 305c are only schematically drawn within FIG. 3 301 denotes a glass slide and 302 denotes a cover slip and the tissue sample is shown with 303. Moreover, the scan direction X' is depicted with arrow 306 and it can easily be gathered that the scan direction X' is substantially perpendicular to the Y direction 308 defining the 2D array of pixels of sensor 311. X direction 307 is also shown in FIG. 3.

The imaging sensor of FIG. 3 has a two-fold improvement over a conventional 2D sensor of the same size and resolution. Maximization of the photoactive part of the pixels in the photosensitive area of the sensor is provided such that the fill factor is maximized. This allows for a sensitive sensor without microlenses. Avoiding microlenses is important for placing the sensor tilted in the optical path of, for example, a scanning imaging microscope. Furthermore the gaps 305a, 305b, and 305c allow for a faster read out because more circuitry can be on the sensor in the gaps allowing for a faster sensor.

Figure 4:
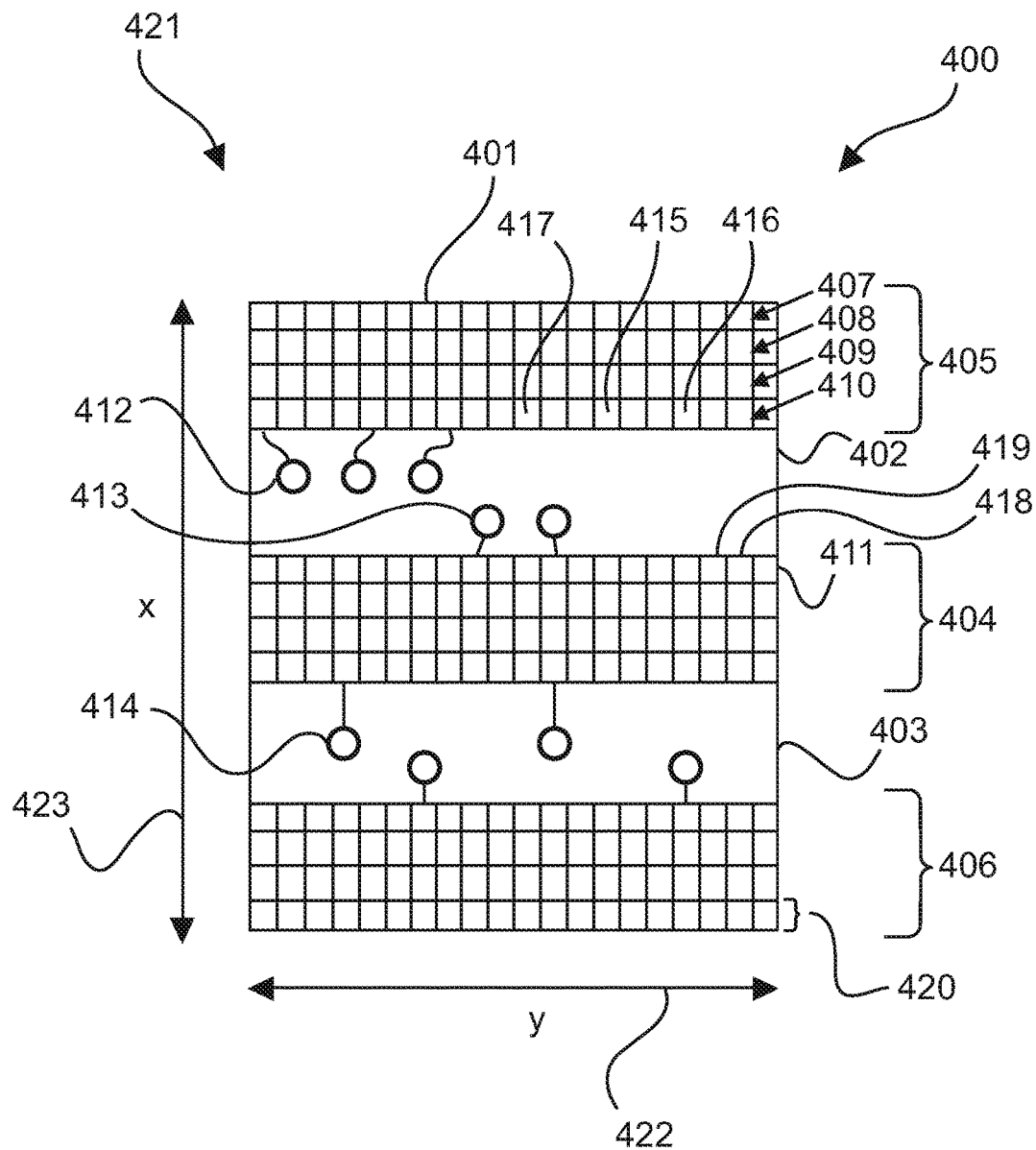
FIG. 4 schematically shows an imaging sensor using TDI principles and the method according to an exemplary embodiment of the present invention.

FIG. 4 schematically shows an imaging sensor 400 according to an exemplary embodiment of the present invention. The imaging sensor comprises a 2D array of pixels 421. The 2D array of pixels comprises a first pixel line 410 which comprises a plurality of pixels, for example pixels 415, 416, 417. As can be gathered from FIG. 4, the first pixel line 410 extends along the Y direction 422 from the left end of the array to right end if the array, thus it extend over the whole breadth of the array. The Y direction is perpendicular to the X direction 423. The 2D array of pixels further comprises a second pixel line 411 comprising a plurality of pixels, pixels 418 and 419 are exemplarily shown with reference signs. Also the second line 411 extends also along the Y direction 422. Furthermore, a first non-photosensitive gap 402 between the first and the second pixel lines is provided. As can be gathered from FIG. 4, this gap also extends along the Y direction. Moreover, read out electronics 412 and 413 of pixels of the first line and/or of pixels of the second pixel line are positioned within the first non-photosensitive gap 402. Of course components, like e.g. an FPGA, may be comprised by the sensor.

The first non-photosensitive gap 402 has a width of at least one width 420 of a pixel of the sensor. In this embodiment, the gap width is approximately five times the width 420 of one pixel of the sensor. Also the second non-photosensitive gap 403 has such a width. Moreover, as can be gathered from FIG. 4, a first block 405 of several adjacent pixel lines 407 to 410 are comprised by the imaging sensor 400. This first block 405 can be controlled as a TDI block. The first non-photosensitive gap 402 comprises read out electronics 412, 413 such as current voltage converters of the pixel line 410 or of line 411 and may also comprise a logic of the imaging sensor 400 and/or a connective circuitry of the imaging sensor 400. Also the second non-photosensitive gap 403 comprises such read out electronics 414 of pixels of the second TDI block 404 and of third TDI block 406. As has been described before, the imaging sensor 400 can also be provided such that the read out electronics of a TDI block are completely provided within the adjacent gap below or above said TDI block along the shown X direction 423. It is thus possible to provide for a TDI block that consists entirely of photodiodes but does itself not comprise read out electronics as they are moved to neighbored gaps. In another exemplary embodiment the sensor has 128 of such blocks 404, 405, and 406 of pixel lines and has 127 or 128 gaps.

A TDI block may be seen as 2D array of pixels with the lines/rows extending along the Y direction, and the columns extending along the X direction. The TDI action takes place along the columns. This TDI action can either be a conventional CCD fashion TDI, where the charge is transferred along the columns synchronized with the motion of the object with respect to the sensor. Alternatively, TDI in the digital domain can be carried out, where the pixel charges are first converted to a digital number, and then transferred in the digital domain synchronized with the motion of the object with respect to the sensor. This 'digital' TDI can take place on the image sensor itself, or 'off-chip', in a computational unit such as an FPGA or computer. The system of the present invention may also comprise a control module which controls the read out of the imaging sensor such that the desired TDI procedure takes place.

A more detailed example of using TDI according to such embodiments is explained in the context of FIG. 4. In FIG. 4, three blocks 404, 405 and 406 of four TDI stages (e.g. 407, 408, 409, 410) are designated in the pixel matrix. Note that a TDI block is meant to be a sub-array of the total pixel matrix, which acts as a functional TDI unit. A person skilled in the art will derive in an obvious manner how a TDI sensor according to such embodiments may operate. Some embodiments will be described herein by way of non limitative examples. All of them are applicable to both of the two dominant imaging sensor types, i.e. CCD and CMOS image sensors. For CCD image sensors the TDI action is typically executed in the analog domain, by copying charge from one set of pixels to another set of pixels. For CMOS image sensors, the TDI action is typically performed in the digital domain, by adding the digital value of one set of pixels to the digital value of another set of pixels. However, digital and analog TDI can both be applied to either of CCD and CMOS.

In the following the TDI action is described as a pixel value transfer, which is to be understood as an analog charge transfer if analog TDI is employed, and as a pixel value transfer if digital TDI is employed.

Turning back to the example of FIG. 4, the sensor is moved to a scan position further with respect to the microscope slide while a pixel value is transferred. In the example of FIG. 4 it will be assumed that the TDI action works upward and the translation of the sample with respect to the sensor is made upward too. Pixel line or stage 410 (a stage preferably includes a full pixel line) starts with pixel values of 0 for each exposure, and pixel values from stage 407 make up the final image in block 405 after each exposure. When following a single line of the image of the sample during a full TDI cycle, the process, which is known in the art, is as follows: during an exposure at a time $t=0$, an image of the sample is captured by the imaging sensor. At the next exposure at $t=1$, the sample is translated such that the part of the image of the sample projected at $t=0$ on stage 410 is now projected on stage 409. Between exposures $t=0$ and $t=1$, the values of the pixels in stage 410 are copied to stage 409. During the exposure at $t=1$, the pixel values resulting from the exposure on stage 409 are added to the already present values, which resulted from the exposure at stage 410 at $t=0$. The values in stage 409, are now the sum of the pixel values resulting from the exposure of stage 410 at $t=0$ and the exposure of stage 409 at $t=1$. Between exposures $t=1$ and $t=2$, the values of the pixels in stage 409 are copied to stage 408. During the exposure at $t=2$, the pixel values resulting from the exposure on stage 408 are added to the already present values, which resulted from the exposure at stage 410 at $t=0$ plus the exposure at stage 409 at $t=1$. The values in stage 408, are now the sum of the pixel values resulting from the exposure of stage 410 at $t=0$ and the exposure of stage 409 at $t=1$, and the exposure of stage 408 at $t=2$. Between exposures $t=2$ and $t=3$, the values of the pixels in stage 408 are copied to stage 407. During the exposure at $t=3$, the pixel values resulting from the exposure on stage 407 are added to the already present values, which resulted from the exposure at stage 410 at $t=0$ plus the exposure at stage 409 at $t=1$, and stage 408 at $t=2$. The values in stage 407, are now the sum of the pixel values resulting from the exposure of stage 410 at $t=0$ and the exposure of stage 409 at $t=1$, and the exposure of stage 408 at $t=2$, and the exposure of stage 407 at $t=3$. Because the image of the sample is translated over the sensor in the same direction, and at the same speed as the TDI action, in this example four equal exposures have been made of the same area on the sample. This is equivalent to a four times longer exposure period without slowing down the translation of the sample and without introducing additional motion blur. The above description applies as well to any other blocks such as blocks 404 and 406 or any further block of the imaging sensor of the present invention.

It is to be noted that in such embodiments the four stages of the TDI blocks may be able to capture an image of the same area at same focus.

Accordingly, the stages of each TDI block may be such that they are separated from the sample by the same distance, approximately.

For example by referring back to the first detailed implementation described above, four stages can be used for each block. Thus, each of the TDI blocks may be constituted by four lines of pixels positioned next to each other with a pitch having the same size as the pixel size. It is to be noted here that a pitch may refer to the distance between the centers of two neighboring pixels. Each TDI block in each embodiment of the present invention may be spaced apart by a non-photosensitive gap distance larger than the pitch. The gap distance determines the Z resolution of the depth positioning of the sensor. It may be advantageous to have a relatively large gap, while having the individual pixels of each TDI block closer together. In this manner a relatively large Z range can be obtained without using too many pixels, because the individual stages of each TDI stage are closer together. As a result they acquire at similar depth and thus reduce image softening due to defocus of one or more stages.

Figure 5:
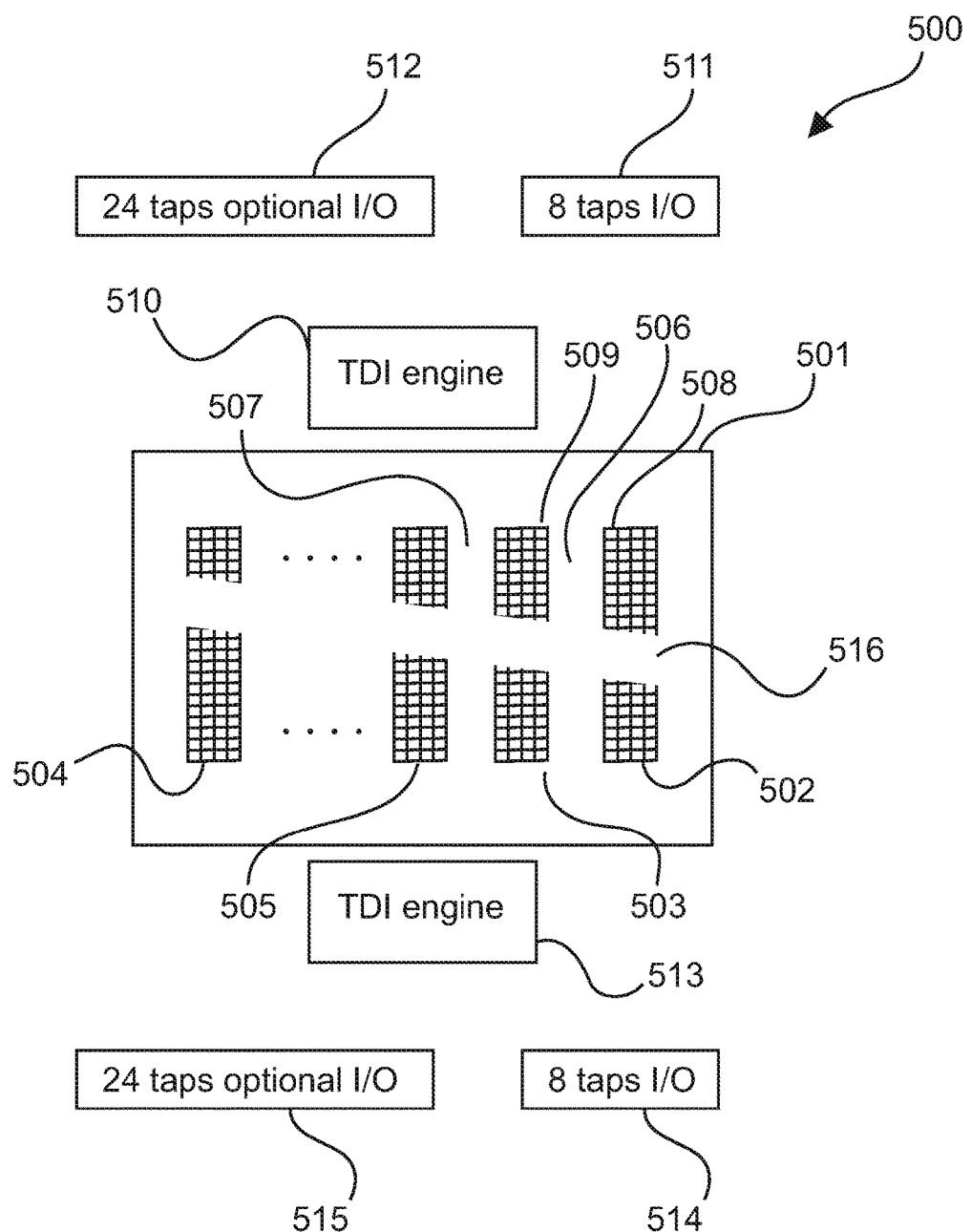
FIG. 5 schematically shows a setup with an imaging sensor using the method according to an exemplary embodiment of the present invention.

According to another exemplary embodiment of the present invention, FIG. 5 shows a setup 500 with an imaging sensor 501 that comprises a first pixel line 508 and a second pixel line 509 that are separated by the non-photosensitive gap 506. First TDI block 502, second TDI block 503, third TDI block 505 and 128th TDI block 504 respectively comprise four lines of pixels. Interruption 516 is shown for the pixel lines as pixel lines are much longer than shown here in FIG. 5. As has been described before, the pixel lines may consist of several thousand pixels, for example, 4000 or more pixels.

FIG. 5 shows also shows two TDI engines 510, 513 which are positioned on the imaging sensor and are thus part of the imaging sensor. Such a TDI engine is configured to carry out any of the known and herein mentioned TDI procedure. In this way, TDI is done on the chip. Also other embodiments are comprised by the present invention, in which the TDI procedure is carried out off the chip, for example by an external computer. The eight input and output taps 511 and 514 are the standard pins for connecting the sensor to a databus. Optionally, the 24 input and output taps 512, 515 can be used in case a higher bandwidth is desired by the user.

Figure 6:
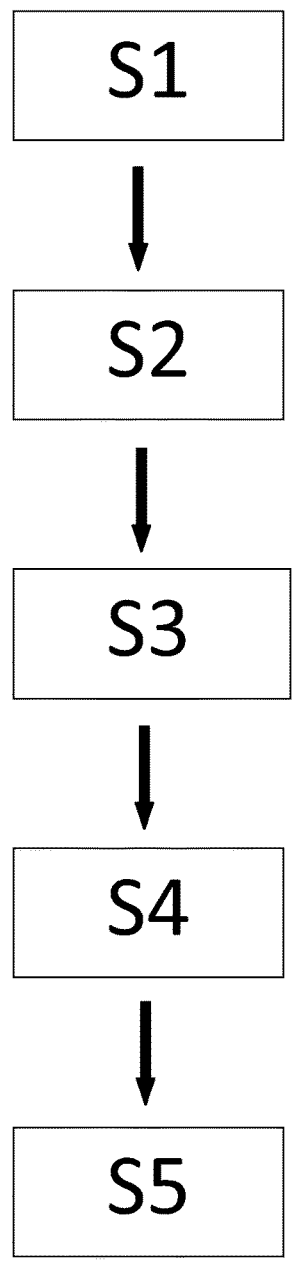
FIG. 6 schematically shows a flow diagram of a method according to an exemplary embodiment of the present invention.

FIG. 6 schematically shows a flow diagram of a method according to an exemplary embodiment of the present invention. In detail, a read-out method for generating seamless 2D or 3D images is presented in FIG. 6 while changing capture depth during the scanning. The method is capable of simultaneously capturing image data at multiple depths of the sample. The method uses an imaging device like, for example, the device described in the context of FIG. 2. The used imaging device has an optical axis and comprises an imaging sensor 300, 400 titled with respect to the optical axis. Such an imaging sensor of the imaging device comprises a first pixel line 410 comprising a plurality of pixels 415, 416 and at least a second pixel line 411 comprising a plurality of pixels 418, 419. The first and second pixel lines have a different optical path length to the sample along the optical axis of the imaging device and are offset with respect to each other along the scan direction by an offset 402.

The method shown in FIG. 6 teaches to scan the sample along a scan direction X' which is substantially perpendicular to a main extension direction Y of the first and second pixel lines of the imaging sensor, i.e., step S1. The second step S2 defines capturing a first image of the sample from the first pixel line, previous to step S3 which requires simultaneously capturing a second image of the sample from the first pixel line and capturing a third image of the sample from the second pixel line. Moreover, in step S4 capturing images of the sample from the second pixel line is continued. Stopping capturing images of the sample from the first lines of pixels is done in step S5.

The method depicted in FIG. 6 with steps S1 to S5, therefore, can be seen as a read-out method which is capable of generating seamless 2D or 3D images while changing capture depth during the scanning. This allows for a fast image acquisition of not perfectly flat and/or volumetric samples. The calculation to determine how long it takes to bridge the respective offset, i.e., the gap between adjacent pixel lines during scanning, can be done by the skilled person without a problem, and can be implemented in the imaging device disclosed herein. Starting from the distance between the two cameras, i.e., the two pixel lines, in projection one knows to how many pixels the distance relates. With the exposure frequency, i.e., the line rate, one knows how many pixels are in the offset/gap.

The imaging device carrying out this method is capable of determining when to start the simultaneous image capturing. In particular, in an exemplary embodiment of the present invention it is detected whether a change in acquisition depth is required, and a corresponding actuation of the second pixel line based on the detection that a change in acquisition depth is required id carried out by the imaging device automatically. Many different technical means can be used for the detection whether a change in acquisition depth is needed, as has been described herein before.

Figure 1:
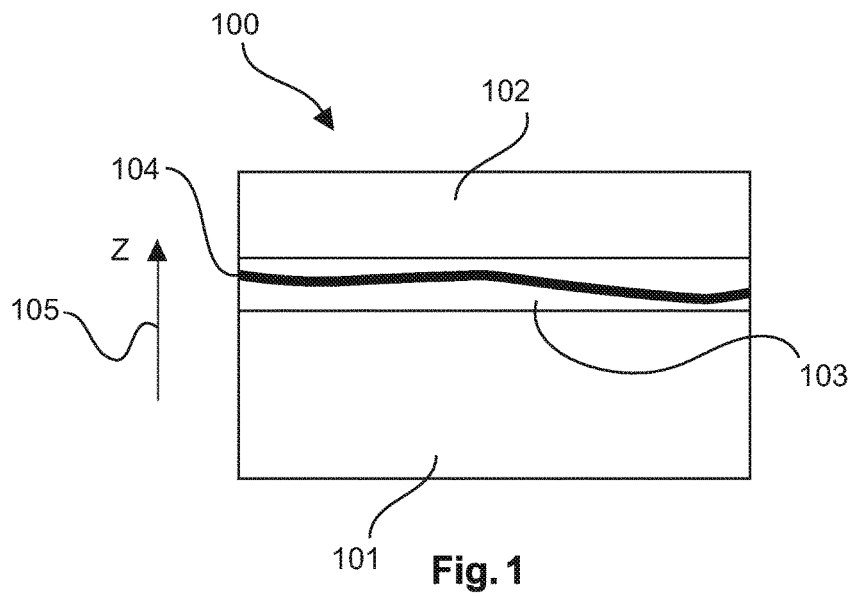
FIG. 1 schematically shows a cross-section of a microscope slide.

The method explained with FIG. 6 allows for a fast image acquisition of not perfectly flat and/or volumetric samples, as shown in FIG. 1, and can be specifically applied in digital slide scanners, e.g. for digital pathology, but also in other technical fields. With this method of FIG. 6 it is possible to capture a seamless image, which would not be possible without the temporary dual, i.e., simultaneous readout, because a change in line sensor results not only in a change of acquisition depth, but also in a translation along the scan direction X'. This latter translation causes either a gap in the image, or a repetition of image data. The method as described before is necessary to prevent the gap. For the repetition, part of the image data can be discarded, but no dual acquisition is needed.

Other variations to the disclosed embodiments can be understood and effected by those skilled in the art in practicing the claimed invention, from the study of the drawings, the disclosure, and the appended claims. For example, as explained previously the invention described in this application encompasses other configurations in which the sensor is not tilted with respect to the optical axis and in which the imaging system is arranged such that this sensor can image an oblique cross section of the sample. Thus, the generation of said different optical path lengths from the sample to the sensor may be made using other techniques well-known in the art such as inserting an optical element, for instance a prism, in the light path.

In the claims the word "comprising" does not exclude other elements or steps and the indefinite article "a" or "an" does not exclude a plurality. A single processor or other unit may fulfil the functions of several items or steps recited in the claims. The mere fact that certain measures are recited in mutually different dependent claims does not indicate that a combination of these measures cannot be used to advantage.

The invention claimed is:

1. Method for simultaneous capture of image data at multiple depths of a sample, using an imaging device having an optical axis,
the device comprising an imaging sensor, the image device being arranged such that the sensor can image an oblique cross-section of the sample, the imaging sensor having:
a first pixel line comprising a plurality of pixels,
a second pixel line comprising a plurality of pixels,
the first and second pixel lines have a different optical path length to the sample along the optical axis of the imaging device,
the first pixel line and the second pixel line are offset with respect to each other along the scan direction by an offset,
the method comprising the steps
scanning the sample along a scan direction (X') which is substantially perpendicular to the optical axis and a main extension direction (Y) of the first and second pixel lines (S1),
capturing a first image of the sample from the first pixel line (S2),
simultaneously capturing a second image of the sample from the first pixel line and capturing a third image of the sample from the second pixel line (S3),
continuing capturing images of the sample from the second pixel line (S4),
stopping capturing images of the sample from the first pixel line (S5).

2. Method according to claim 1,
wherein the offset is either a first non-photosensitive gap between the first and the second pixel lines or a non-capturing pixel line between the first and the second pixel lines which non-capturing pixel line is deactivated.

3. Method according to claim 2,
wherein the non-photosensitive gap extends parallel to the first and second pixel lines.

4. Method according to claim 1,
wherein the steps S1 to S5 are carried out during scanning the sample.

5. Method according to claim 1,
wherein the simultaneous capturing of the second image and the third image is carried out for as long as it takes to bridge the offset between the first pixel line and the second pixel line during scanning.

6. Method according to claim 1, further comprising the steps
detecting whether a change in acquisition depth is required, and
actuating the second pixel line based on the detection that a change in acquisition depth is required.

7. Method according to claim 6,
wherein a method of predicting an optimal focus position is used for detecting whether a change in acquisition depth is required.

8. Method according to one of claim 6, the imaging sensor further comprising
a third pixel line comprising a plurality of pixels,
wherein the first, second and third pixel lines each have a different optical path length to the sample along the optical axis of the imaging device,
wherein the first pixel line and the third pixel line are offset with respect to each other along the scan direction (X') by an offset,
wherein the first pixel line is located between the second and the third pixel line,
the method further comprising the step
actuating the second pixel line in case it has been detected that an increase in acquisition depth is required or actuating the third pixel line in case it has been detected that a decrease in acquisition depth is required.

9. Method according to claim 1, further comprising the step
discarding repetition data acquired by the first pixel line and/or the second pixel line.

10. Method according to claim 9, further comprising the step
generating a final image of the sample based on the captured images after the repetition data was discarded.

11. Method according to claim 10,
wherein the imaging system is an imaging sensor comprising a 2D array of pixels in an orthogonal XY coordinate system, the 2D array of pixels of the sensor comprising the first, second and a third lines of pixels, and
wherein each of the first, second and third pixel lines extends along the Y direction.

12. Method according to claim 1 for generating a three dimensional image of the sample, the method further comprising the steps
capturing the first image of the sample from a first set of lines of pixels comprising the first pixel line,
simultaneously capturing the second image of the sample from the first set of lines of pixels and capturing a third image of the sample from a second set of lines of pixels comprising the second pixel line,
continuing capturing images of the sample from the second set of lines of pixels, and
stopping capturing images of the sample from the first set of lines of pixels.

13. An imaging system for simultaneous capture of image data of a sample at multiple depths, the system comprising
a first pixel line comprising a plurality of pixels,
a second pixel line comprising a plurality of pixels,
wherein the device is configured to scan the sample along a scan direction (X'),
wherein the first pixel line and the second pixel line are offset with respect to each other along the scan direction by an offset,
wherein the imaging system is configured to capture a first image of the sample from the first pixel line,
wherein the imaging system is configured to simultaneously capture a second image of the sample from the first pixel line and capturing a third image of the sample from the second pixel line, and
wherein the imaging system is configured to continue capturing images of the sample from the second pixel line and is configured for stopping capturing images of the sample from the first lines of pixels.

14. An imaging system according to claim 13,
wherein the first and second pixel lines are part of an imaging sensor comprising a 2D array of pixels in an orthogonal XY coordinate system,
wherein the first and second pixel lines extend along the Y direction,
the imaging sensor further comprising a first non-photosensitive gap between the first and the second pixel lines, wherein the first non-photosensitive gap extends along the Y direction, and wherein read out electronics of pixels of the first pixel line and/or of pixels of the second pixel line are positioned in the first non-photosensitive gap.

15. An imaging system according to claim 14, wherein at least one of the following components is positioned in the first non-photosensitive gap or in a further non-photosensitive gap of the sensor:

current voltage converters of pixels of at least one of the first and the second pixel line, a logic of the imaging sensor, and a connective circuitry of the imaging sensor.

16. An imaging system according to claim 15, wherein the imaging sensor is titled with respect to the optical axis.

* * * * *